United States Patent
Shi et al.

(10) Patent No.: US 10,765,997 B1
(45) Date of Patent: Sep. 8, 2020

(54) REGENERABLE NON-AQUEOUS BASIC IMMOBILIZED AMINE SLURRIES FOR REMOVAL OF $CO_2$ FROM A GASEOUS MIXTURE AND A METHOD OF USE THEREOF

(71) Applicant: Energy, United States Department of, Washington, DC (US)

(72) Inventors: Fan Shi, Pittsburgh, PA (US); McMahan L. Gray, Pittsburgh, PA (US); Jeffrey Culp, Wexford, PA (US); Brian W. Kail, Pittsburgh, PA (US); Christopher Mark Marin, South Park, PA (US)

(73) Assignee: U.S. Department of Energy, Washington, DC (US)

( * ) Notice: Subject to any disclaimer, the term of this patent is extended or adjusted under 35 U.S.C. 154(b) by 0 days.

(21) Appl. No.: 16/110,352

(22) Filed: Aug. 23, 2018

(51) Int. Cl.
  *B01D 53/80* (2006.01)
  *B01D 53/62* (2006.01)
  *B01D 53/96* (2006.01)

(52) U.S. Cl.
  CPC ............ *B01D 53/80* (2013.01); *B01D 53/62* (2013.01); *B01D 53/96* (2013.01); *B01D 2252/204* (2013.01); *B01D 2257/504* (2013.01); *B01D 2258/0283* (2013.01)

(58) Field of Classification Search
  None
  See application file for complete search history.

(56) References Cited

PUBLICATIONS

Pavlinek et al., "Electrorheological behaviour of suspensions of various surface-modified porous silica particles." Colloids and Surfaces A, vol. 15 (1999), pp. 241-247.*
Millipore Sigma, specification for silicone oil. Published Aug. 26, 2019. Viewed Dec. 9, 2019 at http://www.emdmillipore.com/US/en/product/Silicone-oil , MDA CHEM-107742#anchor COA.*

* cited by examiner

*Primary Examiner* — Daniel Berns
(74) *Attorney, Agent, or Firm* — Jacob A. Heafner; Michael J. Dobbs; Brian J. Lally

(57) ABSTRACT

The disclosure provides a composition for the separation of $CO_2$ from a gaseous mixture and a method of use thereof. The composition comprises solid Basic Immobilized Amine Sorbents (BIAS) suspended in silicone oil. The method of use comprises contacting the gaseous mixture with a sorbent slurry comprising Basic Immobilized Amine Sorbents (BIAS) and silicone oil to at least partially absorb the $CO_2$ from the gaseous mixture, and regenerating the BIAS slurry by causing desorption of the $CO_2$.

11 Claims, 8 Drawing Sheets

REGENERABLE NON-AQUEOUS BASIC IMMOBILIZED AMINE SLURRIES FOR REMOVAL OF $CO_2$ FROM A GASEOUS MIXTURE AND A METHOD OF USE THEREOF

GOVERNMENT INTEREST

The United States Government has rights in this invention pursuant to the employer-employee relationship of the Government to the inventors as U.S. Department of Energy employees and site-support contractors at the National Energy Technology Laboratory.

FIELD OF THE INVENTION

The disclosure provides a composition for the separation of $CO_2$ from a gaseous mixture and a method of use thereof. The composition comprises solid Basic Immobilized Amine Sorbents (BIAS) suspended in silicone oil. The method of use comprises contacting the gaseous mixture with a sorbent slurry comprising Basic Immobilized Amine Sorbents (BIAS) and silicone oil to at least partially absorb the $CO_2$ from the gaseous mixture, and regenerating the BIAS slurry by causing desorption of the $CO_2$.

BACKGROUND OF THE INVENTION

Carbon sequestration is a viable alternative to reduce the emissions of the greenhouse gas carbon dioxide ($CO_2$) from large point sources. Such sequestration holds the potential to provide deep reductions in greenhouse gas emissions. In general, carbon sequestration is a two-step process where the capture of $CO_2$ from a gas stream is followed by permanent storage. The capture step for $CO_2$ represents a major cost in the overall process.

Of particular interest for $CO_2$ sequestration are power generation point sources that use fossil fuels. Since nearly one-third of the anthropogenic $CO_2$ emissions are produced by these facilities, conventional coal-burning power plants and advanced power generation plants—such as integrated gasification combined cycle—present opportunities where carbon can be removed then permanently stored. At the current time, pulverized coal-fired-base steam cycles have been the predominant electric power generation technology. These will continue to be used in the near future. Technologies for capturing $CO_2$ will need to be applied to new more efficient coal-fired facilities and will need to be retrofitted onto existing plants.

Amine-based solid sorbent methodologies which are both effective sequestering agents and economically feasible are needed for $CO_2$ capture from a gaseous mixtures, whether the capture occurs in combustion or gasification power generation systems from flue gas, or in other applications such as natural gas sweetening. Because of the high concentration of $CO_2$ in any of these feed streams, a large quantity of the gas will react with the sorbent and thus produce considerable amounts of exothermic heat. This heat must be removed from the sorbent to prevent temperature instability within the reactor, to assure the sorbent will operate at optimum temperature, and to eliminate the potential degradation of the sorbent because of high temperature excursions.

For coal-fired power plants, the conventional scrubbing system that is currently the comparative baseline for all other capture technologies is monoethanolamine (MEA) scrubbing. This wet scrubbing process removes $CO_2$ in an absorber then regenerates the spent scrubbing liquor in a vessel by indirectly heating the solution with plant steam. Although there have been large scale commercial demonstrations of this technology, the process has several disadvantages including a high heat of reaction, low working capacity, corrosiveness of the solution, the susceptibility of being poisoned, and most notably, its need to be in an aqueous solution. This latter disadvantage results in a large energy need to regenerate the spent solution, especially the sensible heating of the water, which is a minimum of 70 wt % of the solution. The water is recognized as an inert carrier between the absorption and regeneration steps. Another energy loss while regenerating the spent MEA solution includes evaporative heat loss of vaporizing liquid water.

One $CO_2$ capture technology that can be applied to various gas streams has, as a basis, dry regenerable solid sorbents. Examples of these types of sorbents are zeolites, activated carbon, alkali/alkaline earth metals, immobilized amines, metal organic framework, etc. A specific sorbent technology that shows significant advancement are amine-based solid sorbents, such as Basic Immobilized Amine Sorbents (hereinafter BIAS). BIAS consist of amines (primary, secondary, tertiary, or a combination thereof) deposited onto a porous support. The manner of deposition can be random or structured deposition of the amine onto this support (silica, polymer, etc.). When used in the industrial setting, the dry solid sorbent process may act in a similar fashion to the wet scrubbing process in that the sorbent would be transported between an adsorption step and a regeneration step and in that the sorbent is regenerated by a temperature-swing application.

One of the main benefits in using the solid sorbent is the elimination of the sensible heat for the liquid water as compared to MEA. A secondary benefit lies in the lower heat capacity for the solid versus the liquid solvent, also serving to lower the sensible heat required. More $CO_2$ can be adsorbed on a weight or volume basis with the amine-based solid sorbents, so the sorbent system is capable of a significant decrease in the heat duty for the regeneration step. A lower cost of energy service for process involving BIAS as compared to amine wet scrubbing may also result. Thus amine-based solid sorbents have the capability to improve the overall energetics of $CO_2$ capture.

Unfortunately, reactor designs which are amenable to flowing solid sorbents present issues with management of those mobile solid sorbents. For example, sorbents of a particle size capable of efficient $CO_2$ adsorption are often easily aerosolized, carried into a flue stream, and progressed further through the reactor system where they cause damage to downstream components and are overall lost. Sorbent particles of sufficient size to not be at risk for being aerosolized are significantly less efficient at sorption per unit mass, which leads to an increase in the mass of sorbent required. Further, sorbent particles themselves are vulnerable in industrial processes as they do not have the structural integrity necessary for prolonged use in reactors. Where the sorbent has low structural integrity and readily breaks down, greater material investment is required and the sorbent becomes less economical to utilize over other competing materials and methods.

BIAS and their associated processes are among the most widely studied solid sorbents to mitigate post-combustion $CO_2$ emissions. BIAS are organized into three classes (1-3) according to their preparation procedure and amine immobilization mechanisms. Class 1 BIAS are generally prepared by dry or wet impregnation of a support, namely different grades of silica, with a polyamine/hydrophilic solvent (methanol, ethanol, etc.) mixture. Principal polyamines employed are tetraethylenepentamine (TEPA), polyethylenimine (PEI), and generally various linear or branched polyamines that possess different ratios of —$NH_2$ (primary)/—NH (secondary)/—N (tertiary) amine groups that can potentially adsorb $CO_2$. These polyamines are bound to the supports by Si—OH—$NH_2$ hydrogen bonding and also ionic $SiO^-$—$NH_2^+$/—$NH^+$ interactions. Primary and secondary amines can capture $CO_2$ under dry and wet conditions while tertiary amines primarily capture $CO_2$ only under humid conditions. The manner of amine deposition on the support can be random or structured deposition of the amine onto the support. In addition to silica, other supports may include clays, polymers, activated carbons, zeolites, and others.

Class 2 BIAS are typically prepared by wet impregnation of a mixture of a reactive aminosilane and anhydrous hydrophobic solvent, usually toluene, onto a dry, pre-treated silica support. Strict control of the $H_2O$ content within the system is maintained to manipulate the subsequent grafting reaction between the aminosilane and the silica support. The grafted aminosilanes are immobilized to the silica support via covalent Si—O—Si linkages. These Si—O—Si linkages are also responsible for immobilizing the aminosilane within the bulk of the pore via polymerization.

BIAS sorption capacity is typically calculated either on a weight-percent-of-sorbent basis or mmol $CO_2$/g-sorbent basis. For weight percent basis, the weight of adsorbed $CO_2$ is divided by the weight of sorbent and multiplied by 100. For the mmol $CO_2$/g-sorbent basis, the weight of adsorbed $CO_2$ is divided by the molecular weight of $CO_2$ (44 g/g-mole), multiplied by 1,000, and divided by the sorbent weight.

Advancements in reactor design from batch, fixed-bed systems to continuous circulating fluidized bed, rotating disk, and moving bed systems, and development of a steam-stable sorbent under practical conditions are promising milestones towards commercialization. However, the aforementioned inherent difficulties in the application of such a small particle-size sorbent to industry scale processes remain. For example, BIAS degrades structurally over time as the material is moved from one industrial environment to another. Additionally, the light BIAS can be picked up by and carried into a gas stream, leading to loss of the material and degradation of components downstream. Further, the current amine based sorbent technology utilized in $CO_2$ separation is that the impregnated liquid amines of the BIAS sorbents are vulnerable to leaching from the sorbent pores by condensed steam during practical $CO_2$ adsorption-desorption testing under humidified conditions. The deleterious effect of steam on the $CO_2$ capture of BIAS materials is widely seen in the literature, and was attributed to, in part, amine leaching from the sorbents. Additional difficulties with small particle sorbents include high energy costs to overcome large pressure drop across sorbent beds and failure of, specifically, internal moving parts (valves, conveyors, etc.) by agglomerated or aerosolized particles.

Because of these issues, a composition comprising a BIAS sorbent slurry comprising BIAS suspended in a non-aqueous fluid carrier is advantageous for its improved large scale application. It would be advantageous to provide a sorbent slurry for $CO_2$ capture using an amine-based solid sorbent suspended in a nonaqueous fluid, where the sorbent slurry is capable of efficient $CO_2$ sorption while preventing water loading. Such a method utilizing the slurry further would present a relatively low economic burden when compared to solid based capture systems incorporated into current power generation operations, being relatively easy to incorporate into established power plants when compared to solid based post-combustion separation systems. Thus, utilization of a BIAS slurry increases in $CO_2$ capture capability while minimizing energy and infrastructure requirements is realized.

Accordingly, it is an object of this disclosure to provide a composition for the separation of $CO_2$ from a gaseous mixture, the composition comprising a slurry of BIAS suspended in liquid polymerized siloxane. Further, the object of this disclosure is to provide a method of use for the composition, the method comprising contacting the gaseous mixture with the slurry composition Basic Immobilized Amine Sorbent suspended in liquid polymerized siloxane such that $CO_2$ absorbs into the slurry to form a laden slurry, and regenerating the laden slurry to remove the absorbed $CO_2$.

These and other objects, aspects, and advantages of the present disclosure will become better understood with reference to the accompanying description and claims.

SUMMARY OF THE INVENTION

The disclosure describes a composition for the separation of $CO_2$ from a gaseous mixture, the composition comprising solid BIAS suspended in liquid polymerized siloxane. Further, this disclosure describes a method of use for the composition, the method comprising contacting a gaseous mixture with the composition such that $CO_2$ absorbs into the slurry to form a laden slurry, and regenerating the laden slurry to remove the absorbed $CO_2$. The composition and method are useful for removing $CO_2$ from a gaseous mixture such as a post combustion gas stream.

The composition (slurry, or BIAS slurry) comprises Basic Immobilized Amine Sorbent (BIAS) suspended in liquid polymerized siloxane (silicon oil). The BIAS functions as the primary sorbent of $CO_2$ from a gaseous mixture. The silicon oil functions as the carrier fluid for the BIAS. Silicon oils are generally hydrophobic yet are permeable to $CO_2$, thus, they are able to function to effectively move BIAS through a sorbent system without appreciably lowering the $CO_2$ capacity while also limiting $H_2O$ uptake by the sorbent slurry.

The method may be carried out in a reactor design easily retrofitted to current power plants and is simpler than solid sorbent designs. The reactor design facilitates contacting a gaseous mixture in a common component such as a scrubber.

In comparison to MEA, sorbent slurries have reduced corrosivity by immobilizing the amine on a solid support suspended in a non-aqueous carrier fluid. In comparison to aqueous solvent systems in general, the replacement of water with a low heat capacity and low polarity, hydrophobic non-volatile solvent provides a reduction in regeneration costs (about 1.5 J/gK compared to about 4.2 J/gK), and feasible operating costs (viscosity no more than 20 cSt at absorption/desorption temperature of 60-100° C.).

The sorbent slurry is capable of removing $CO_2$ from a gaseous mixture. An exemplary gaseous mixture is a post-combustion gas stream from power generation. Such a flue gas stream would comprise $N_2$ and $CO_2$ as its primary constituents. Removal in another exemplary gaseous mixture is the sweetening of raw natural gas, where a stream of raw piped gas comprises primarily $CH_4$ as well as varying amounts of other hydrocarbons. The hydrocarbon gaseous mixture is sweetened by removal of $CO_2$.

The sorbent slurry separates by primarily absorbing the $CO_2$ by first external diffusion of $CO_2$ from the bulk gas stream into and through the carrier fluid; followed by subsequent reaction of the $CO_2$ with BIAS amine groups. Reaction of $CO_2$ with the amines will primarily form ammonium-carbamate ion pairs.

DETAILED DESCRIPTION OF THE INVENTION

The following description is provided to enable any person skilled in the art to use the invention and sets forth the best mode contemplated by the inventor for carrying out the invention. Various modifications, however, will remain readily apparent to those skilled in the art, since the principles of the present invention are defined herein specifically to provide a composition and method for separating $CO_2$ from a gaseous mixture. The composition is a slurry comprising Basic Immobilized Amine Sorbents suspended in a silicone oil. The method comprises contacting a gaseous mixture with a composition comprising BIAS suspended in a silicon oil, and treating the resulting $CO_2$ laden sorbent slurry to remove the absorbed $CO_2$ from the laden sorbent slurry.

The gaseous mixture necessarily comprises $CO_2$ or a mixture of $CO_2$ and at least one other gas. As noted above, preferred gaseous mixtures include post combustion gas streams such as flue gas. Flue gas typically comprises as main constituents $N_2$ and $CO_2$.

The composition is a mixture of Basic Immobilized Amine Sorbent (BIAS or sorbent) suspended in a polymerized silicone oil (carrier fluid). Suspension of the BIAS is typically achieved by one of several methods such as stirring or agitation. One method of formation of the BIAS slurry is by addition of a known mass of the solid BIAS to a known volume of the carrier fluid, then agitating the mixture at 60° C. for no less than 30 minutes or until a uniform suspension is achieved where the solid BIAS particles are generally uniformly distributed throughout the carrier fluid.

Preferred weight percent of BIAS loading is determined by retaining such fluid behavior allows the slurry to be stirred, pumped, aspirated, or otherwise amenable for incorporation into industrial processes while maintaining acceptable $CO_2$ sorption. In general, the viscosity of the resulting slurry should be no more than 400 cSt at 25° C. The BIAS in the mixture are preferably present in an amount up to the highest mass loading that still retains the fluid behavior of the entirety of the suspension, typically up to 35 weight percent (wt %).

Carrier Fluid

Figure 1:
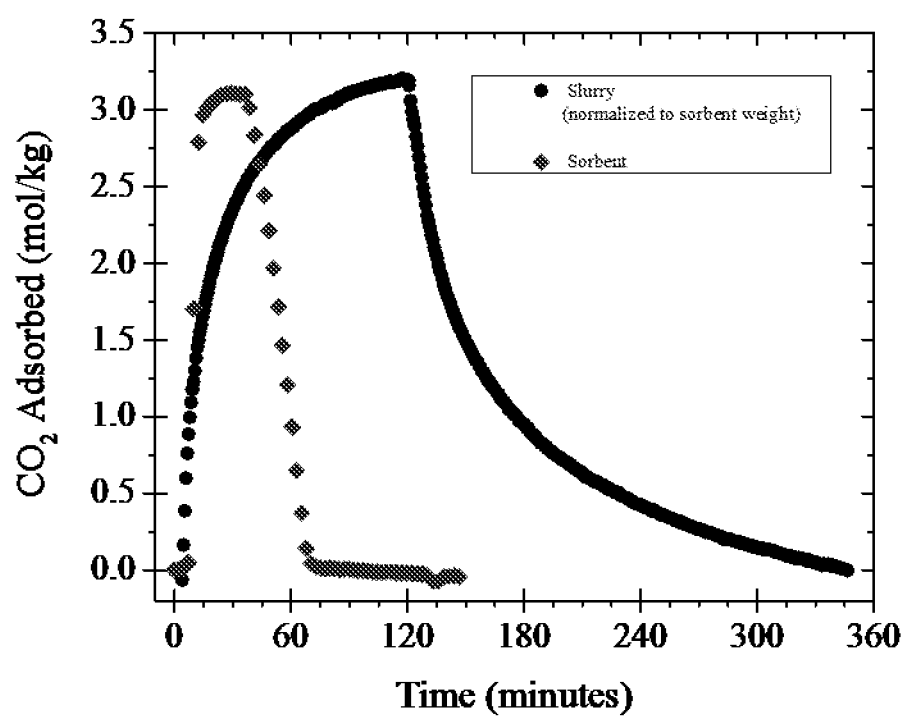
FIG. 1. illustrates a comparison of $CO_2$ uptake normalized to the mass of sorbent for pure sorbent BIAS 102B (3.1 mmol/g at 15% $CO_2$ 85% $N_2$ at 1 bar, 65° C.) and a slurry of the same sorbent dispersed in solvent PMM-1015 (phenylmethylsiloxane-dimethylsiloxane copolymer) (3.3 mmol/g in 100% $CO_2$ at 1 bar, 80° C.).
Figure 2:
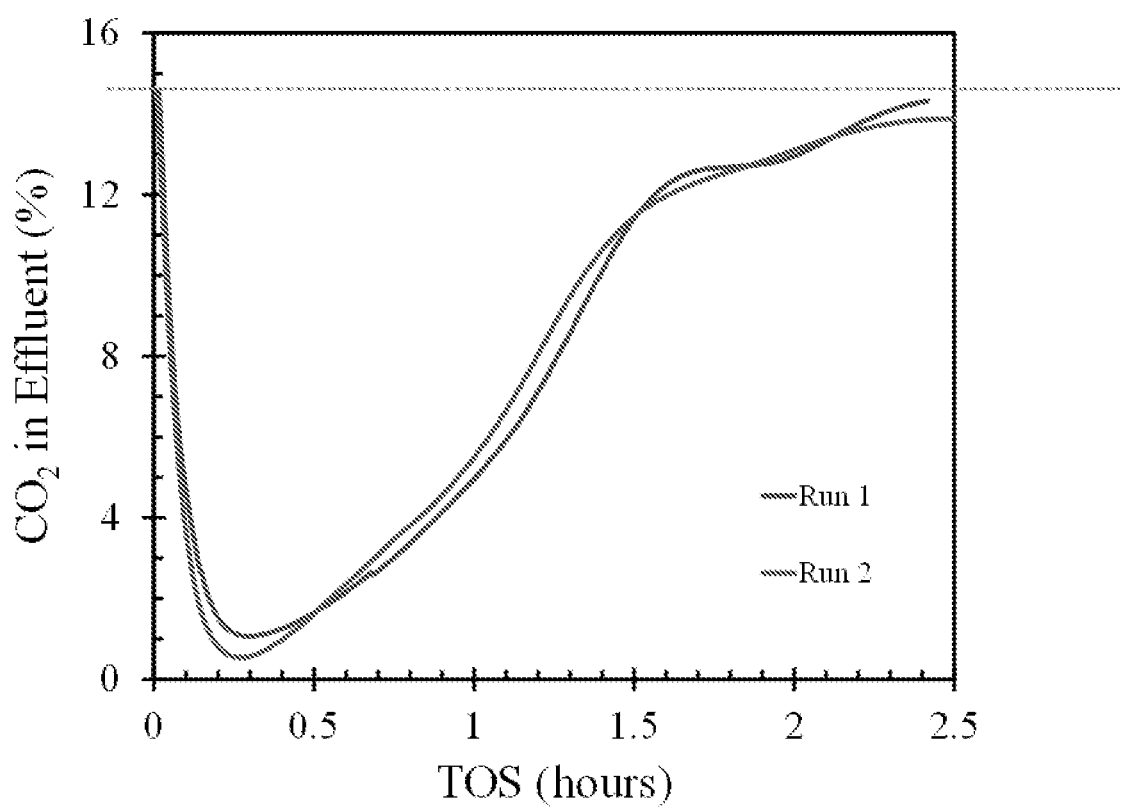
FIG. 2. illustrates a comparison of $CO_2$ absorption of a single BIAS slurry after regeneration, as performed in a continually stirred reactor (20 wt % BIAS 105C sorbent in DMS-T12R silicone oil, 0.8 mmol/g at 15% $CO_2$, 85% $N_2$ 4% $O_2$ at 1 bar, 65° C., regeneration under 100% $N_2$, 1 bar, 110° C.).
Figure 3:
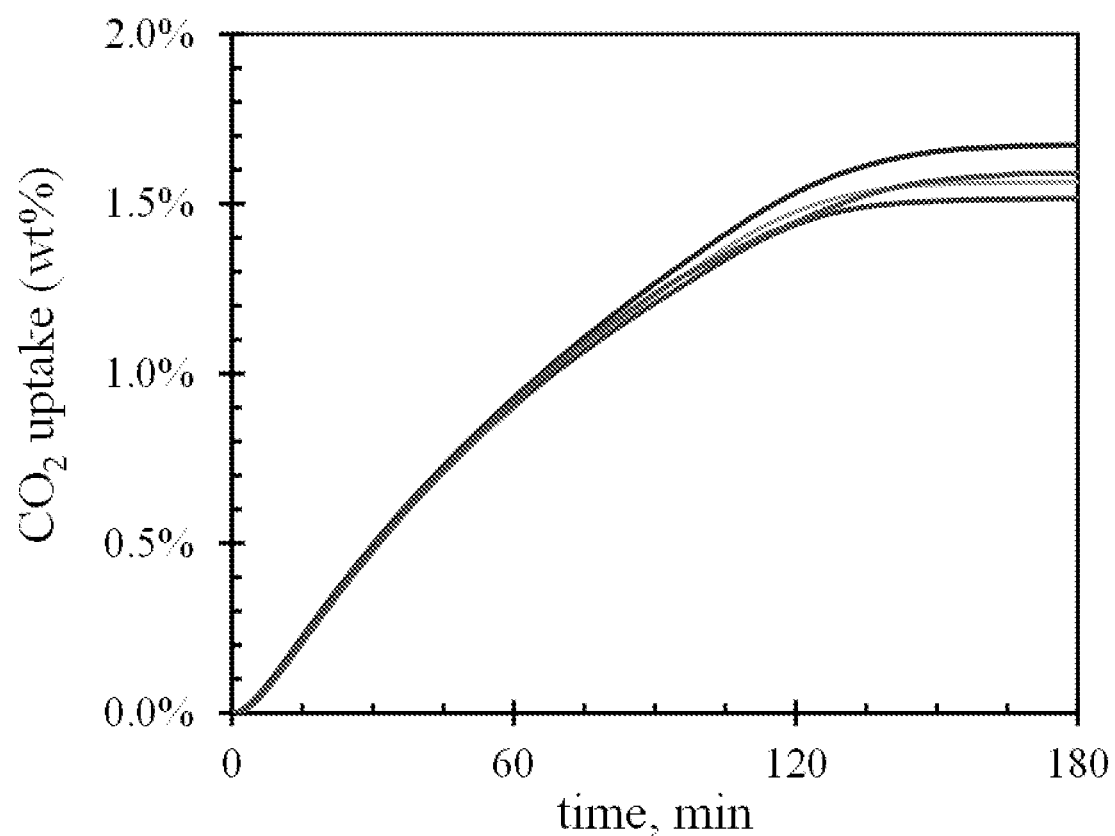
FIG. 3. illustrates a comparison of $CO_2$ absorption from both wet and dry gas streams of a single BIAS slurry after regeneration, as performed in a continually stirred reactor (20 wt % BIAS 105C sorbent in DMS-T12R silicone oil, at 15% $CO_2$, 85% $N_2$ 4% $O_2$ at 1 bar, 65° C., regeneration under 100% $N_2$, 1 bar, 110° C.).
Figure 4:
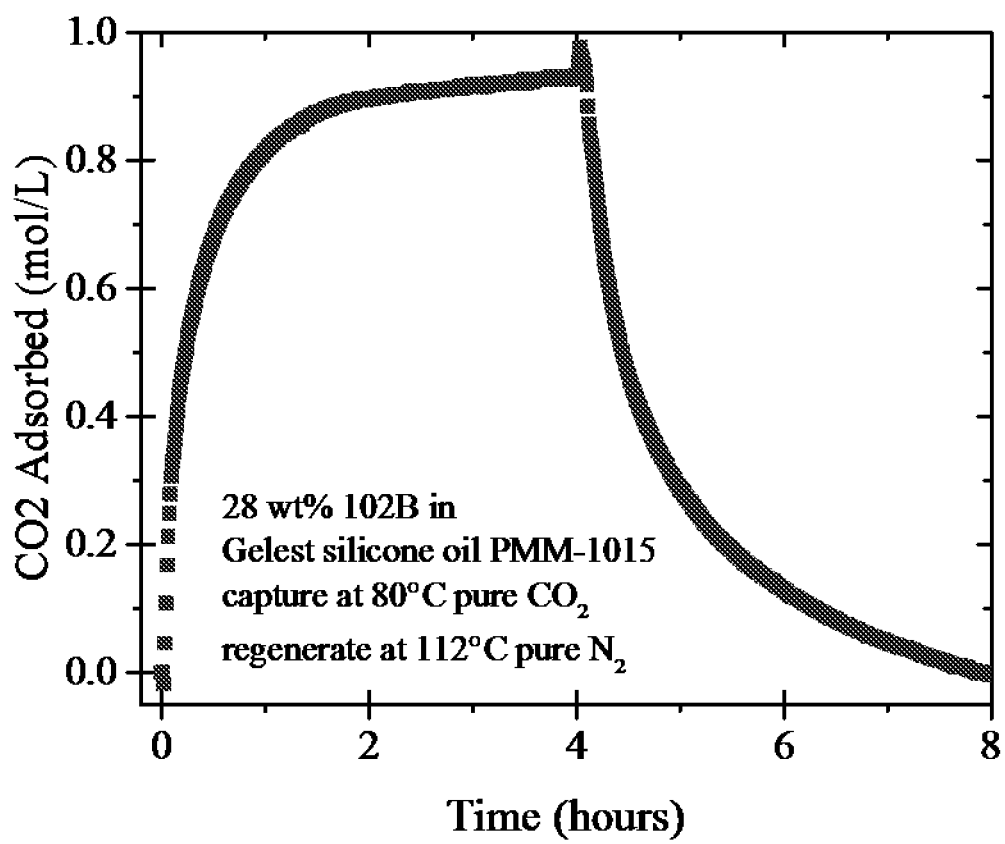
FIG. 4. illustrates a 28 wt % slurry performance (28 wt % BIAS 102B sorbent in PMM-1015 at 100% $CO_2$ at 1 bar, 80° C., regeneration under 100% $N_2$, 1 bar, 110° C.).
Figure 5:
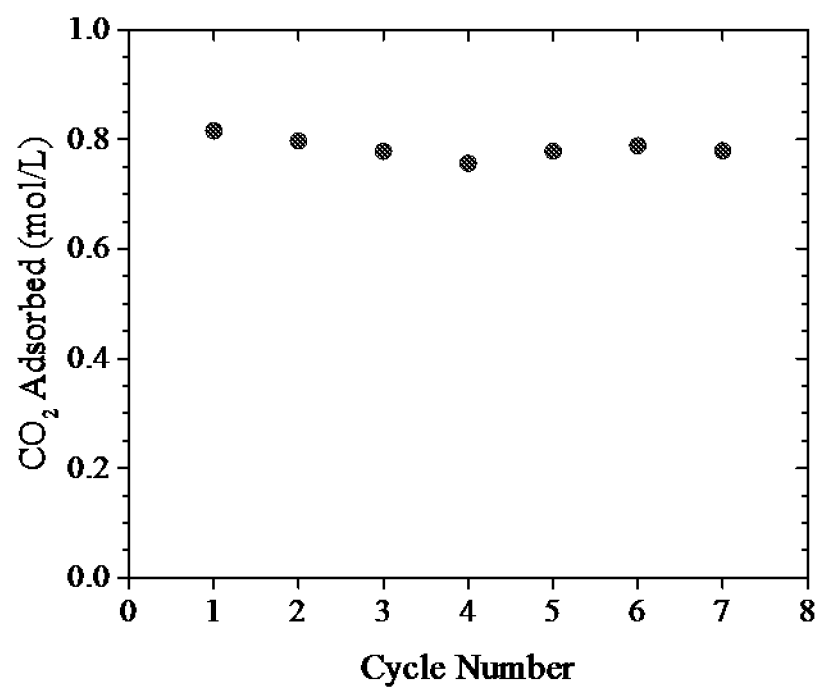
FIG. 5. illustrates stability of a BIAS slurry after seven cycles (30 wt % BIAS 105C sorbent in DMS-T12R at 100% $CO_2$ at 1 bar, 80° C., regeneration under 100% $N_2$, 1 bar, 100° C. at 110° C.).
Figure 6:
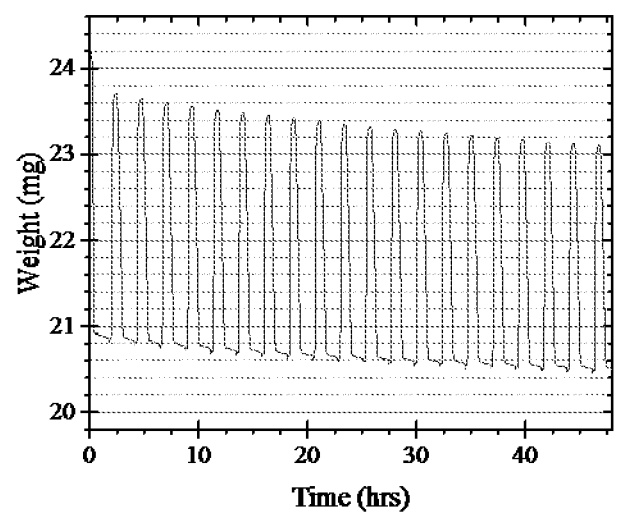
FIG. 6. illustrates static cycling tests of a BIAS 102B sorbent (15% $CO_2$ at 65° C., regeneration at 115° C.)
Figure 7:
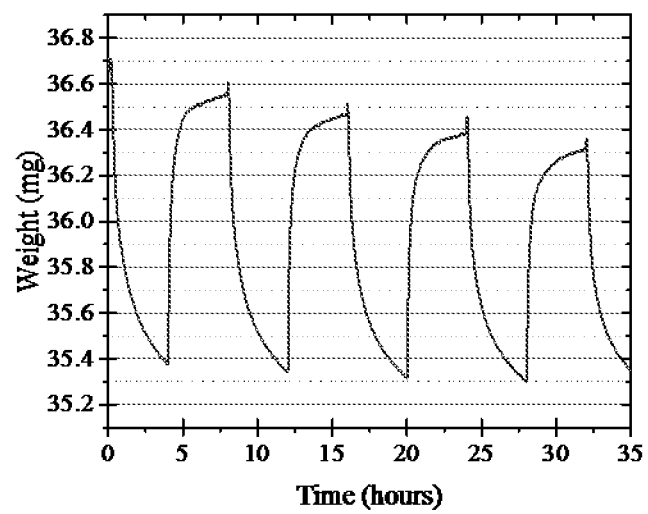
FIG. 7. illustrates static cycling tests of a BIAS slurry (28 wt % BIAS 102B sorbent in PMM-1015, 15% $CO_2$ at 80° C., regeneration at 115° C.).

As used in the disclosed method, the carrier fluid comprises one or more polymerized silicon oil(s). Silicone oils are liquid polymerized siloxanes with organic side chains. These polymerized silicon oils are non-polar, high boiling (>200 Co), low heat capacity (<3.8 KJ/Kg K) hydrophobic liquids with molecular weight less 1500 g/mol. An exemplary silicone oil is monocarbinol terminated polydimethylsiloxane (MCR-12). Critically, the carrier fluid does not interfere or compete with $CO_2$ adsorption sites in the sorbent. As shown in FIG. 1, use of the polymerized silicone oils allow the relatively equal sorption of $CO_2$ by the sorbent slurry in comparison to the same sorbent alone, when normalized to the mass of the sorbent in the slurry.

The carrier fluids include non-polar, high boiling, and low heat capacity hydrophobic silicon oils with molecular weight less 1500 g/mol. The thermal stability of the slurry allows the capture and regeneration processes to occur at higher temperatures, thus reducing the need to cool the flue gas. The lack of volatility for the slurry removes the energy penalty that is associated with evaporative losses of water and amine in the aqueous MEA process. Further, the carrier fluids are thermally stable, where thermally stable means no obvious degradation over 1000 hours under $CO_2$ absorption and desorption environment. Solid sorbents operating via a fluid slurry offers advantages over using the solid sorbent alone. These benefits include improved heat transfer, reduced attritions of the sorbent, and a much simpler reactor design employing a continuous flow process.

Basic Immobilized Amine Sorbent

Preferred BIAS for use in the sorbent slurry include Class 1, Class 2, or hybrid class 1/class 2 sorbent types. Preferred sorbents have silica as the support and amine species that possess any combination of primary and secondary amines. The physical characteristics of the BIAS are critical to their incorporation into the pelletized sorbent. The BIAS powders are preferentially 1 nm to 25 μm in diameter. Further, BIAS particles may be ground prior to mixing with the carrier fluid. Such grinding serves to process the particles into a size preferential for suspension in the carrier fluid as well as expose a greater number of functional groups for $CO_2$ capture.

Preferred $CO_2$ capture capacity of the starting BIAS particles is from about 0.1 to about 1.0 mmol $CO_2$/g. More preferred $CO_2$ capture capacity of the BIAS before pelletization is from about 1.0 to about 2.8 mmol $CO_2$/g. Most preferred BIAS possess $CO_2$ capture capacity before pelletization greater than about 2.8 mmol $CO_2$/g.

Preferred amines for the BIAS are polyamines that contain more than one as well as any combination of the following amine groups: primary (—$NH_2$), secondary (—NH), and tertiary (—N) amines. Preferentially, BIAS sorbents possess an amine loading between 1 and 65 wt %. Preferred BIAS sorbents possess an amine loading between 20 and 45 wt %. More preferred BIAS sorbents possess an amine loading between 45 and 65 wt %.

BIAS Slurry Composition:

A salient aspect of the invention is the final BIAS slurry composition. Key parameters are the sorbent capacity of the BIAS slurry, primarily as a result of the suspended BIAS. The preferred BIAS loading range as the following: from about 20 to about 40 wt % as BIAS sorbent weight. The BIAS slurries demonstrate high $CO_2$ capture capacity (in ~4 wt % or ~1.0 mmol $CO_2$/g-slurry) relative to their weight. As expected, an increasing wt % of BIAS results in increasing $CO_2$ sorption. Another salient aspect of the invention is that the BIAS slurry is hydrophobic in that it repels $H_2O$ vapor or condensed $H_2O$, thus preserving the $CO_2$ capture capability. As noted previously, a disadvantage of the current stand-alone BIAS is that they are vulnerable to leaching from the sorbent pores by condensed steam during practical $CO_2$ adsorption-desorption testing under humidified conditions. However, the negative effect of steam in the gaseous mixture is remedied by the suspension of the BIAS in the hydrophobic carrier fluid. The hydrophobic carrier fluid minimizes contact between the BIAS's amines and condensed steam during $CO_2$ capture cycling under practical humid conditions. This hydrophobicity extends the performance of the BIAS.

To meet a $CO_2$ absorption capacity target at 1.0 mmol $CO_2$/g, typical slurries are comprised of at least 25 wt % Basic Immobilized Amine sorbent by total sorbent weight. Preferred BIAS slurries are comprised of from about 20% to about 40% by dry sorbent weight. More preferred BIAS slurries are comprised of from about 27% to about 35% by total dry pelletized sorbent weight.

Viscosity of slurry is a key operating parameter and can directly affect the pump operation during $CO_2$ capture processes. Generally viscosity decreases along with increasing operating temperature, but increases with the loading of solid. Results for $CO_2$ capture capacities were previously discussed and can be seen in FIGS. 2-7. A preferred BIAS slurry contained about 28 wt % sorbent, and captured ~0.8 mmol $CO_2$/g and had density of 1.2 g/cm3, and viscosity of less than 50 cSt.

Preferred BIAS slurries comprised of the BIAS suspended in a carrier fluid possess a $CO_2$ capture of greater than 0.8 mmol $CO_2$/g, a viscosity from 20 to 50 cSt at absorption temperature, and a solid mass loading of from about 20 to about 35 wt %. More preferred, the BIAS slurries possess a $CO_2$ capture of greater than 1.0 mmol $CO_2$/g, a viscosity from 20 to 30 cSt, and a solid mass loading of from about 27 to about 35 wt %.

Further disclosed is a method for separation of $CO_2$ from a gaseous mixture utilizing the previously disclosed composition. The method comprises contacting a gaseous mixture comprising $CO_2$ with a BIAS slurry comprising solid Basic Immobilized Amine Sorbents suspended in a liquid polymerized siloxane. Contacting provides bringing into physical communication (contact) the $CO_2$ of the gaseous mixture to the BIAS slurry as when flowing a gaseous mixture across the surface of a BIAS slurry or bubbling the gaseous mixture through a BIAS slurry, such that at least a portion of the $CO_2$ is absorbed by the BIAS slurry to form a laden slurry. Laden slurry comprises BIAS slurry and absorbed $CO_2$. Following the resulting formation of the laden slurry, regenerating the laden slurry removes at least a portion of the absorbed $CO_2$ from the laden slurry to reform the BIAS slurry. Contacting the BIAS slurry with the gaseous mixture may be accomplished through means well known in the art, such as via a scrubber operation, closed chamber, packed bed reactor, slurry bubble reactor, stirred reactor, etc.

Regenerating provides removal of at least a portion of $CO_2$ from the laden slurry formed during contacting. Regenerating is a desorption step which reforms the laden slurry back to sorbent slurry. The regeneration of sorbent slurry provides for repetition of the method, such that the BIAS slurry is able to perform more than one cycle of the method. Regenerating may be accomplished by several methods, for example conventional heating, pressure swing, etc.

Figure 8:
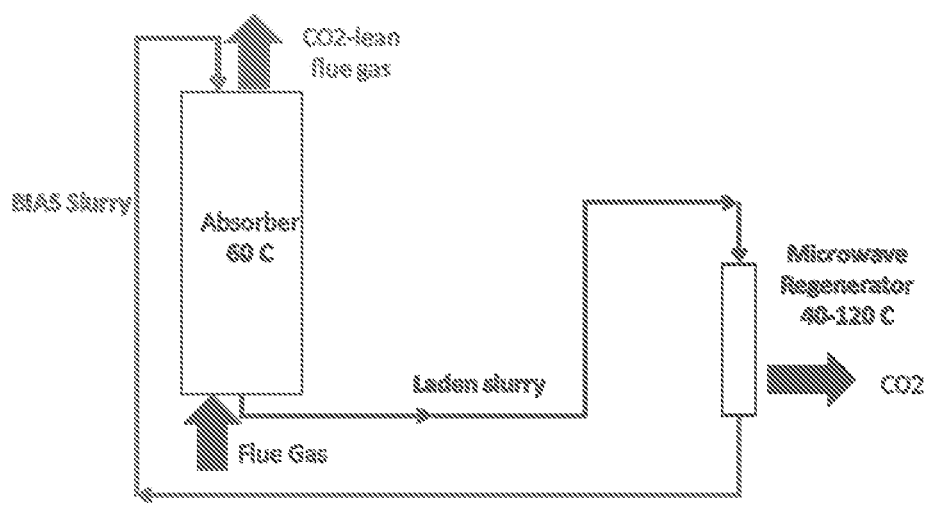
FIG. 8. illustrates a slurry based absorption/MW regeneration process for $CO_2$ capture.

A salient aspect of the composition and its use in the method is that regeneration may be accomplished by microwave (MW) excitation of the laden slurry as shown in FIG. 8. After absorption in an absorber at temperature in a range about 60-70° C., $CO_2$ saturated laden slurry may be regenerated in a relative small microwave regenerator at temperature in a range from 40-120 120° C. The major advantage of this MW-assisted regeneration method is fast $CO_2$ desorption kinetics. Another advantage is that MW can selectively heat BIAS sorbents not the non-polar silicon oils since silicone oil has relatively low MW energy absorption while the amine supported sorbent has relatively high MW absorption capacity. Regeneration by microwave desorption may enable a fast regeneration with a low purge gas flow rate and lower process temperature that translates into energy savings. Further, the elimination of a steam requirement in comparison to regeneration by heating may reduce or eliminate corrosivity associated with solvent/amine steam stripping and again reduces thermal input requirements and reactor size as is illustrated in FIG. 8. Thus, MW-assisted regeneration may provide a fast and high energy efficient regeneration solution for the carbon capture process.

In one example, a typical slurry was made by adding dry BIAS 95A sorbents with particle size between 80 and 120 microns into non-polar, low vapour pressure hydrophobic DMS-T12R silicon oils with molecular weight no more than 1500 g/mol. Sorbent loading was performed at 25 wt %. The slurry was then agitated in $N_2$ at 65° C. for 30 minutes to achieve uniformity before exposed to a simulated flue gas containing 14% of $CO_2$ in $N_2$, or a gas stream of pure $CO_2$ for 6 hours. 10 mL of resulting slurry was investigated for microwave assisted regeneration study using a CEM Discover SP Microwave reactor. Cyclic absorption and microwave assisted regeneration were performed as described above.

Results of MW assisted regeneration of slurry are indicated in Table 1. The major advantage of this MW-assisted regeneration method is a fast $CO_2$ desorption kinetics, compared to conventional heating regeneration method. It only took less than 2 minutes to release $CO_2$ gas stream from the slurry, comparing to several hours of the convention thermal regeneration method. $CO_2$ concentration increased along with time-on-stream (TOS) and temperatures. The preferred regeneration temperature for $CO_2$ desorption was around 100° C. As much as 42% of $CO_2$ was found in gas phase after 60 minutes of regeneration at 100° C. Another major advantage is possible high pressure pure $CO_2$ product. As indicated in Table 1, up to 30 psig of pressure was also found in gas phase, indicating approximately 20 psi of $CO_2$ partial pressure.

Stability performance of slurry was studied at 100° C., as indicated in Table 1. The slurry of 25 wt % of BIAS 95A in DMS-T12R oil showed strong stability after several 2-min MW cycles and one 60-min MW cycle at 100° C. There were no apparent changes in the physio- and chemical properties of slurry.

TABLE 1

MW regeneration vs. conventional heating regeneration

| Temp. (° C.) | TOS (min) | $CO_2$ Conc. (%) | Pressure (psig) | Pulsed MW output (W) |
|---|---|---|---|---|
| 60* | 5 | 0.06 | n/a | Conventional heating |
| 100* | 2 | 0.3 | n/a | Conventional heating |
| 100* | 60 | 7.3 | n/o | Conventional heating |
| 40 | 2 | 0.2 | n/a | <5 |
| 60 | 2 | 0.3 | 3 | <8 |
| 60 | 5 | 0.7 | 9 | <10 |
| 100 | 2 | 15.7 | 26 | 13-20 |
| 100 | 2 | 16.9 | 25 | 13-20 |
| 100 | 60 | 42 | 30 | 13-20 |

It is to be understood that the above-described arrangements are only illustrative of the application of the principles of the present invention and it is not intended to be exhaustive or limit the invention to the precise form disclosed. Numerous modifications and alternative arrangements may be devised by those skilled in the art in light of the above teachings without departing from the spirit and scope of the present invention. It is intended that the scope of the invention be defined by the claims appended hereto.

In addition, the previously described versions of the present invention have many advantages, including but not limited to those described above. However, the invention does not require that all advantages and aspects be incorporated into every embodiment of the present invention.

All publications and patent documents cited in this application are incorporated by reference in their entirety for all purposes to the same extent as if each individual publication or patent document were so individually denoted.

We claim:

1. A composition for the separation of $CO_2$ from a gaseous mixture, the composition comprising:
   a carrier fluid comprising polymerized silicone oil, wherein the carrier fluid has a molecular weight of less than 1500 g/mol; and,
   basic immobilized amine sorbent (BIAS) is suspended in the carrier fluid.

2. The composition of claim 1, wherein the carrier fluid has a boiling point greater than 200° C.

3. The composition of claim 1, wherein the basic immobilized amine sorbent is a class 1 where class 1 are prepared by dry or wet impregnation of a support with a polyamine/hydrophilic solvent mixture, class 2 where class 2 are prepared by wet impregnation of a mixture of a reactive aminosilane and anhydrous hydrophobic solvent onto a dry pre-treated silica support, class 1/class 2 hybrid, or a combination thereof.

4. The composition of claim 1, wherein the composition is hydrophobic.

5. The composition of claim 1, wherein the $CO_2$ capture capacity of the composition is greater than 0.8 mmol/L.

6. The composition of claim 5, wherein the $CO_2$ capture capacity of the composition is greater than 1.0 mmol/L.

7. A composition for the separation of $CO_2$ from a gaseous mixture, the composition comprising:
   a carrier fluid comprising polymerized silicone oil; and,
   basic immobilized amine sorbent (BIAS) is suspended in the carrier fluid, wherein the basic immobilized amine sorbent ranges from about 20 to about 35 wt. % of the composition.

8. The composition of claim 7, wherein the basic immobilized amine sorbent ranges from about 27 to about 35 wt. % of the composition.

9. A composition for the separation of $CO_2$ from a gaseous mixture, the composition comprising:
   a carrier fluid comprising polymerized silicone oil;
   basic immobilized amine sorbent (BIAS) is suspended in the carrier fluid; and,
   wherein the viscosity of the composition ranges from about 20 to about 50 cSt.

10. The composition of claim 9, wherein the viscosity of the composition ranges from about 20 to about 30 cSt.

11. A composition for the separation of $CO_2$ from a gaseous mixture, the composition comprising:
    a carrier fluid comprising polymerized silicone oil, wherein the carrier fluid has a molecular weight of less than 1500 g/mol and a boiling point greater than 200° C.; and,
    basic immobilized amine sorbent (BIAS) is suspended in the carrier fluid, wherein the BIAS is a class 1 where class 1 are prepared by dry or wet impregnation of a support with a polyamine/hydrophilic solvent mixture, class 2 where class 2 are prepared by wet impregnation of a mixture of a reactive aminosilane and anhydrous hydrophobic solvent onto a dry pre-treated silica support, class 1/class 2 hybrid, or a combination thereof; wherein the basic immobilized amine sorbent ranges from about 27 to about 35 wt. % of the composition; wherein the viscosity of the composition is in a range from about 20 to about 30 cSt; wherein the $CO_2$ capture capacity is greater than 1.0 mmol/L; and wherein the composition is hydrophobic.

\* \* \* \* \*